US012597008B2

(12) United States Patent
Kato

(10) Patent No.: US 12,597,008 B2
(45) Date of Patent: Apr. 7, 2026

(54) ARTICLE REGISTRATION DEVICE, CART POS SYSTEM EQUIPPED WITH ARTICLE REGISTRATION DEVICE, AND ARTICLE REGISTRATION METHOD

(71) Applicant: TOSHIBA TEC KABUSHIKI KAISHA, Tokyo (JP)

(72) Inventor: Suguru Kato, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 351 days.

(21) Appl. No.: 18/530,256

(22) Filed: Dec. 6, 2023

(65) Prior Publication Data

US 2024/0362606 A1 Oct. 31, 2024

(30) Foreign Application Priority Data

Apr. 26, 2023 (JP) ................................. 2023-071998

(51) Int. Cl.
| | |
|---|---|
| *G06Q 20/20* | (2012.01) |
| *G06Q 20/18* | (2012.01) |
| *G06V 10/25* | (2022.01) |
| *G07G 1/00* | (2006.01) |

(52) U.S. Cl.
CPC ........... *G06Q 20/208* (2013.01); *G06Q 20/18* (2013.01); *G06V 10/25* (2022.01); *G07G 1/0045* (2013.01)

(58) Field of Classification Search
CPC ...... G06Q 20/208; G06Q 20/18; G06V 10/25; G06V 10/141; G06V 20/52; G07G 1/0045; G07G 1/0054; G07G 1/0081
See application file for complete search history.

(56) References Cited

U.S. PATENT DOCUMENTS

| | | | | |
|---|---|---|---|---|
| 8,744,187 B2 * | 6/2014 | Naito | .................... | G07G 1/0045 |
| | | | | 382/181 |
| 10,953,906 B1 * | 3/2021 | McMahon | ............ | B62B 3/1424 |
| 11,620,822 B1 * | 4/2023 | Ron | ..................... | G06Q 20/208 |
| | | | | 382/103 |
| 12,060,099 B1 * | 8/2024 | Hager | .................. | G06Q 10/087 |
| 12,086,783 B1 * | 9/2024 | Justen | .................. | G07G 1/0045 |
| 12,151,733 B2 * | 11/2024 | Hagen | ................... | B62B 3/1488 |

(Continued)

FOREIGN PATENT DOCUMENTS

JP 6537054 7/2019

*Primary Examiner* — Ashford S Hayles

(74) *Attorney, Agent, or Firm* — Amin, Turocy & Watson, LLP

(57) ABSTRACT

An article registration device detects an area where a merchandise item is put, performs image capture corresponding to the brightness of the area, and registers the article within the captured image, a cart POS system equipped with an article registration device, and an article registration method. The article registration device includes an image pickup device, an illumination unit, a position detection unit, and an information terminal. The position detection unit divides an image capture area into a plurality of areas and detects an area where the article is put under the illumination of the illumination unit. The information terminal sets an exposure time under the illumination of the illumination unit on a per image pickup device basis in such a way that the set amount of exposure is achieved, and causes the capture an image, recognize the article within the captured image, and register the article.

20 Claims, 10 Drawing Sheets

(56) References Cited

U.S. PATENT DOCUMENTS

| | | | |
|---|---|---|---|
| 12,217,457 B1 * | 2/2025 | Miranda Artacho | .........................<br>G06V 10/768 |
| 12,299,728 B1 * | 5/2025 | Sadanand | .............. G01G 19/52 |
| 12,340,360 B2 * | 6/2025 | Yang | ................... G06V 30/2247 |
| 2010/0282841 A1 * | 11/2010 | Connell, II | ......... G07G 1/0018<br>235/383 |
| 2012/0294479 A1 * | 11/2012 | Naito | ................... G07G 1/0045<br>382/103 |
| 2014/0324627 A1 * | 10/2014 | Haver | ................ G06Q 30/0273<br>701/519 |
| 2016/0300376 A1 * | 10/2016 | Fuse | ................... H04N 23/741 |
| 2017/0046563 A1 * | 2/2017 | Kim | ....................... G06F 18/217 |
| 2018/0218224 A1 * | 8/2018 | Olmstead | ............. G07G 1/0045 |
| 2018/0218351 A1 * | 8/2018 | Chaubard | .......... G01G 19/4144 |
| 2018/0232595 A1 * | 8/2018 | Nobuoka | ............... G06V 20/64 |
| 2019/0102824 A1 * | 4/2019 | Sun | ....................... G01C 21/343 |
| 2020/0137301 A1 * | 4/2020 | Fields | .................. H04N 23/689 |
| 2020/0275059 A1 * | 8/2020 | De Bonet | ........... G06V 10/141 |
| 2021/0067746 A1 * | 3/2021 | Yones | .................. G06Q 20/203 |
| 2021/0345794 A1 * | 11/2021 | Cohn | .................... B62B 3/1416 |
| 2022/0101551 A1 * | 3/2022 | Eberspach | ................ G06T 7/70 |
| 2022/0103739 A1 * | 3/2022 | Lei | .......................... H04N 23/73 |
| 2022/0198550 A1 * | 6/2022 | Meidar | ................. G06Q 20/20 |
| 2023/0129779 A1 * | 4/2023 | Sommer | ................ G06V 20/52<br>382/157 |
| 2023/0143479 A1 * | 5/2023 | Hagen | ........................ G06T 7/11<br>345/420 |
| 2023/0147769 A1 * | 5/2023 | Hagen | ................. G06Q 20/208<br>705/23 |
| 2023/0252443 A1 * | 8/2023 | McDaniel | ........... G06V 10/255<br>705/23 |
| 2024/0013184 A1 * | 1/2024 | Huang | ................. G07G 1/0072 |
| 2024/0070880 A1 * | 2/2024 | Moshkovitz | ......... G06V 10/764 |

* cited by examiner

1

ARTICLE REGISTRATION DEVICE, CART POS SYSTEM EQUIPPED WITH ARTICLE REGISTRATION DEVICE, AND ARTICLE REGISTRATION METHOD

CROSS-REFERENCE TO RELATED APPLICATION

This application is based upon and claims the benefit of priority from Japanese Patent Application No. 2023-071998, filed Apr. 26, 2023, the entire contents of which are incorporated herein by reference.

FIELD

Embodiments described herein relate generally to an article registration device that recognizes and registers an article within an image without any exposure difference, a cart POS system equipped with an article registration device, and an article registration method.

BACKGROUND

Normally, to purchase a merchandise item, a person performs merchandise registration and payment with a checkout machine installed in a store. A cart POS (point of sales) system for a retail store equipped with a shopping cart has been proposed. In such a cart POS system, the shopping cart is provided with an information terminal having a touch panel and a barcode scanner or the like. When placing an article to be purchased onto the shopping cart, a user who is a customer using the shopping cart uses the barcode scanner to read an identification code of the merchandise item to be purchased (a barcode or a two-dimensional code such as a QR code (trademark registered)) and registers the merchandise item, using a barcode recognition technique.

The category of this system includes a cart POS system using AI (artificial intelligence). Such a cart is referred to as a frictionless cart, AI cart, smart cart, intelligent cart or the like. On this shopping cart, a plurality of image pickup devices are arranged around a basket, and when a merchandise item to be purchased is put into or taken out of the basket, a package recognition technique of picking up an image of the merchandise item with each image pickup device, recognizing the package of the merchandise item based on the picked-up images, automatically identifying the type of the merchandise item, and automatically registering the merchandise item, is used.

However, if a plurality of image pickup devices pick up images of one merchandise item at the same timing, the brightness may differ between the images picked up by the image pickup devices, depending on the place where the merchandise item is put, for example, whether it is at the center of the basket or in a corner of the basket, or the like. That is, an image pickup device at a short distance from the merchandise item put in the basket captures a bright image, whereas an image pickup device at a long distance captures a darker image than the image picked up at a short distance. Also, it is time-consuming for each image pickup device to automatically adjust the exposure time in order to prevent blown-out highlights due to overexposure. Therefore, it is conceivable that the start of the recognition of the merchandise item may be delayed. Also, the automatic exposure adjustment to achieve an optimum brightness may not be able to be performed and the merchandise item may not be able to be recognized.

2

DETAILED DESCRIPTION

An embodiment described herein is to provide an article registration device that, when capturing images of a merchandise item to be purchased with a plurality of cameras, adjusts the exposure timing of each camera according to the position where the merchandise item is put, thus acquires images without any exposure difference, and registers the article by package recognition or identification code recognition using the images, a cart POS system equipped with an article registration device, and an article registration method.

In general, according to one embodiment, an article registration device includes: at least one image pickup device configured to capture an image of an article put in an image capture area; at least one illumination unit configured to illuminate the image capture area for a lighting period based on a set amount of exposure; a position detection unit configured to divide the image capture area into a plurality of areas and detect an area where the article is put under the illumination of the illumination unit; and an information terminal configured to set an exposure time under the illumination of the illumination unit on a per image pickup device basis in such a way that the set amount of exposure is achieved, based on a brightness of illumination corresponding to a distance between the detected area and the image pickup device, thus cause the image pickup device to capture an image, recognize the article within the captured image, and register the article.

An embodiment of a cart POS system equipped with an article registration device will now be described, using the drawings. The article registration device in this embodiment is configured, including an information terminal, a camera as an image pickup device, and an illumination unit described later, and is as an illumination device, incorporated in the cart POS system. In the description below, it is assumed that an identification code attached to or printed on a merchandise item is a barcode or a two-dimensional code such as a QR code (trademark registered). Capturing an image of a merchandise item with the camera as the image pickup device is referred to as image capture or exposure. The shutter opening time of the camera or the time duration for which light is cast on the image pickup element thereof is referred to as an exposure time. The amount of light incident on the camera in this case is referred to as an amount of exposure. The brightness (or luminance value) of an area is considered synonymous with the brightness (amount of exposure) of an optical image (image) incident on the camera, of a merchandise item put in an area under the illumination, when the image of the merchandise item is captured by the camera.

First Embodiment

Figure 1:
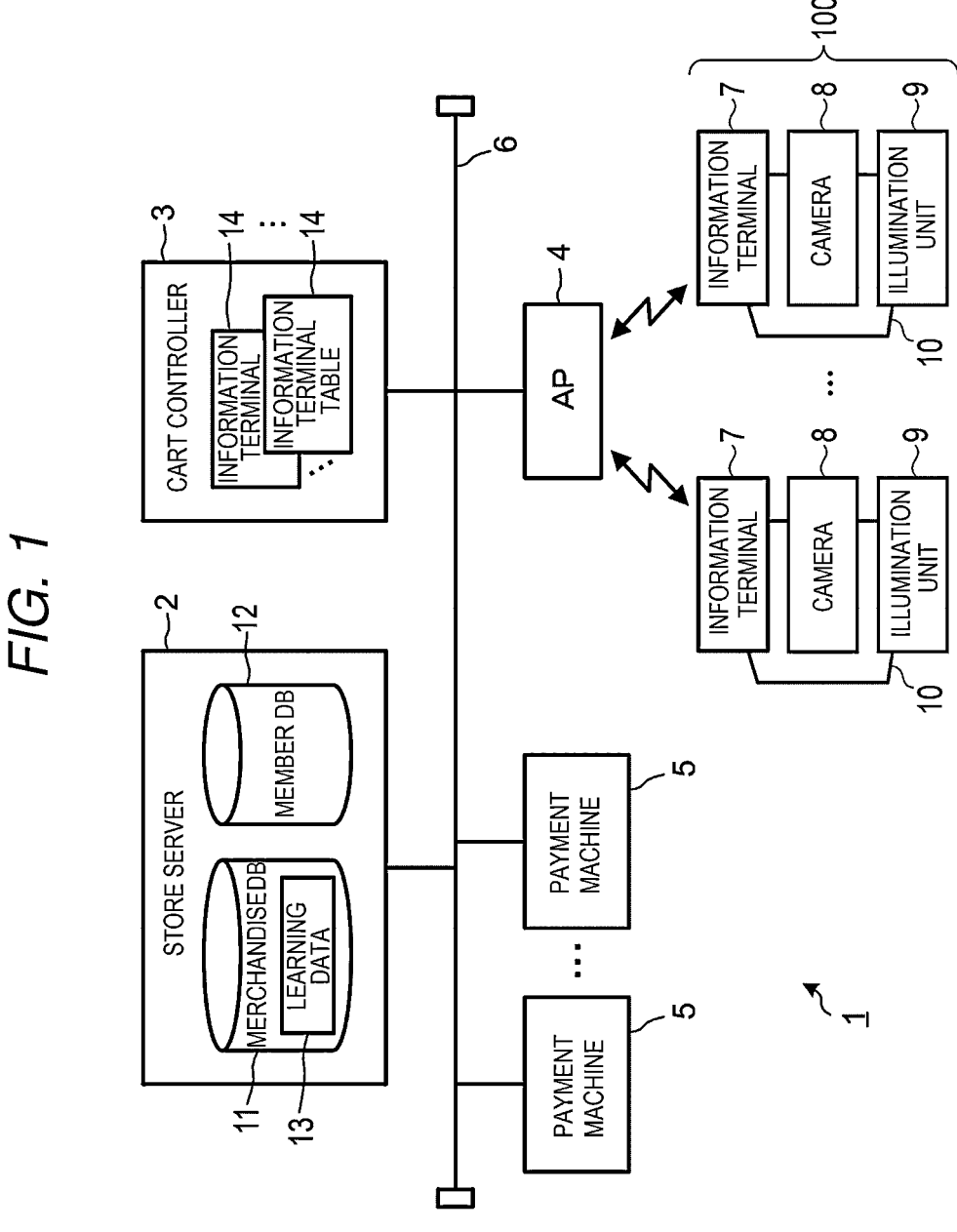
FIG. 1 shows an overall configuration of a cart POS system equipped with an article registration device according to a first embodiment.

FIG. 1 shows an overall configuration of a cart POS system 1 according to a first embodiment. The cart POS system 1 includes a store server 2, a cart controller 3, an access point (referred to as AP in FIG. 1) 4, and a payment machine 5. The store server 2, the cart controller 3, the access point 4, and the payment machine 5 are connected to a network 6 such as a LAN (local area network) or a wireless LAN. The cart POS system 1 includes a plurality of information terminals 7 connected to the network 6 by wireless communication via the access point 4.

An article registration device 100 is a device that enables a customer as a purchaser to register a merchandise item to be purchased by self-service, using the information terminal 7 and a camera 8. The information terminal 7, the camera 8 (equivalent to 8a to 8d in FIG. 3), and an illumination unit 9 (equivalent to 9a to 9d in FIG. 3) are provided in a plurality of shopping carts 10 used by customers when shopping in a store. In the description below, the shopping cart 10 is simply referred to as the cart 10. The plurality of carts 10 are an example of a carrier unit for a customer to carry a merchandise item to be purchased. Although not illustrated, each cart 10 is equipped with a rechargeable battery to drive the information terminal 7, the camera 8, and the illumination unit 9.

The information terminal 7 is an information processing device functioning as a user interface for an operation corresponding to the registration of a merchandise item or the cancellation of registration (hereinafter simply referred to as "cancellation"). The information terminal 7 has a wireless unit as a communication unit with the access point 4. The access point 4 relays the communication between each device connected to the network 6, that is, the store server 2, the cart controller 3, and the payment machine 5 on one hand, and the information terminal 7 on the other hand.

While only one access point 4 is shown in FIG. 1, two or more access points 4 may be provided according to the scale of the store, or the like.

The payment machine 5 is a device that enables a store clerk or a customer to perform the payment (settlement) for a registered merchandise item. As the payment machine 5, for example, a known face-to-face POS terminal is used if the store clerk performs the payment, and a known self-service POS terminal is used if the customer performs the payment. The number of payment machines 5 is not particularly limited.

The store server 2 supports, for example, a payment operation, a stocking operation, a stock management operation, a sales operation, and a customer service operation (customer service and response, complaint handling and the like), or the like, as store operations. To provide such support, the store server 2 manages a merchandise database (DB) 11, a member database (DB) 12, and the like.

The merchandise database 11 saves a merchandise record that describes merchandise data on a per merchandise item basis that is put on sale at the store. The merchandise record includes a merchandise code, a price, a merchandise name, and the like. The merchandise code is the identification code of the merchandise item. The merchandise database 11 includes a sales database. The sales database save a sales record that describes sales data on a per entry item basis such as merchandise item, category, time bracket, date, week, and month. The sales data includes the number of items sold, the amount of sales, and the like.

In this embodiment, the merchandise database 11 stores learning data 13 that is learned in advance, in order to recognize a merchandise item saved in the merchandise database 11, based on AI (artificial intelligence). The learning data 13 is an aggregate of merchandise-specific learning data corresponding to information about each merchandise item put on sale at the store (including the content, the external appearance and shape, the package and wrapping pattern, the merchandise name described thereon (character format) and the like). Each merchandise-specific learning data is incorporated in the learning data 13, for example, in correlation with the merchandise code. In time with the update of the merchandise database 11 corresponding to the addition or replacement of a merchandise item put on sale at the store, the merchandise-specific learning data corresponding to the merchandise item, of the learning data 13, can be updated. The merchandise-specific learning data of each merchandise item may be generated and provided to the store by the provider of the merchandise item or may be generated independently at the store.

The member database 12 saves a member record that describes member data on a per member basis. The member data includes a member ID, a name, a gender, an email address, and the like. The member ID is a univocal code such as a member number set on a per member basis in order to identify each individual member. A member owns a recording medium in which the member ID is recorded. The recording medium is, for example, a magnetic card, a contact IC (integrated circuit) card, a contactless IC card, a smartphone, or the like.

The store server 2 may also manage a member settlement database, though not particularly illustrated. The member settlement database saves a member settlement record that describes necessary data for the payment of a price on a per member basis. The member settlement record includes an electronic money identification code and an electronic money user ID as the necessary data for the payment of a price, as well as a member ID.

In the cart POS system 1 according to this embodiment, a settlement in which a member does not use the payment machine 5, that is, a settlement without cash payment, is available. However, the price payment method in this case is limited to one type, that is, payment by electronic money. The electronic money identification code is an identification code of electronic money registered in advance as the method used for the payment of a price by the member identified by the member ID. The electronic money user ID is identification information for an electronic money center EMC to identify the user of the electronic money and is provided by the electronic money center EMC.

In order to enable payment by electronic money, the member registers the electronic money identification code and the electronic money user ID in advance, for example, at the time of member registration. If the electronic money is not registered in advance, "NULL" or "0000" is stored as the electronic money identification code and the electronic money user ID in the member settlement record. If electronic money is made available, the store server 2 has the function of a communication server, or the cart POS system 1 includes a server. The store server 2 or the communication server supports data communication processing carried out via an external communication network such as the internet or a dedicated network for electronic money between the payment machine 5 or the cart controller 3 and an electronic money center that supports settlement by electronic money.

The cart controller 3 collaborates with the information terminal 7 and thus supports the information terminal 7 to function as a POS terminal. The cart controller 3 has an information terminal table 14 corresponding to each information terminal 7. In this embodiment, an example where the information terminal table 14 is provided in the cart controller 3 is described. However, a memory area may be provided in an auxiliary memory device 23 of the information terminal 7 and the information terminal table 14 may be set in each memory area. In such a case, the store server 2 may manage the information terminal table 14 along with the information terminal 7. The information terminal table 14 is a part of the components of the article registration device 100.

Figure 2:
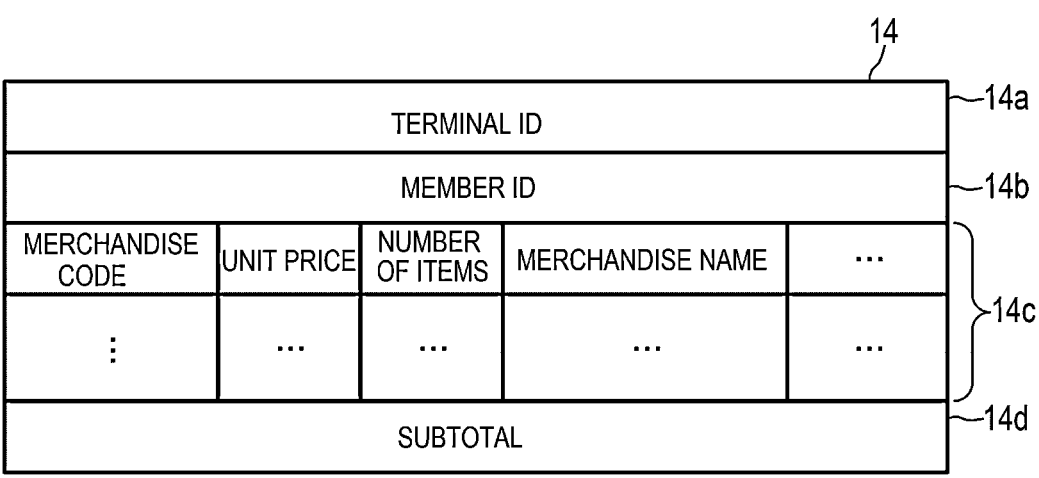
FIG. 2 is a schematic view showing a main data structure of an information terminal table.

FIG. 2 is a schematic view showing a main data structure of the information terminal table 14.

The information terminal table 14 has a terminal ID area 14a, a member ID area 14b, one or a plurality of merchandise-to-be-purchased data areas 14c, and a subtotal area 14d. The terminal ID area 14a stores a terminal ID, which is a code such a terminal number to univocally identify the information terminal 7 corresponding to this information terminal table 14. The member ID area 14b stores a member ID. In the merchandise-to-be-purchased data area 14c, a merchandise-to-be-purchased list is generated, that is, merchandise-to-be-purchased data about a merchandise item to be purchased is stored, every time the customer registers the merchandise item to be purchased with the information terminal 7.

Alternatively, the merchandise-to-be-purchased list is updated every time the customer stops purchasing a merchandise item and cancels the registration thereof, from among the merchandise items already registered with the information terminal 7. The merchandise-to-be-purchased list is made up of the merchandise code, the unit price, the number of items to be sold (number of items), the merchandise name, the amount of sales, the amount of tax, and the like, of a merchandise item to be purchased by the customer. The subtotal area 14d shows amount data representing the total of the amount of sales and the amount of tax for all the merchandise items to be purchased by the customer, calculated by adding up the amounts in the merchandise-to-be-purchased list stored in the merchandise-to-be-purchased data area 14c. This amount data is updated every time the customer registers a merchandise item to be purchased or cancels the registration, as in the merchandise-to-be-purchased list.

Figure 3:
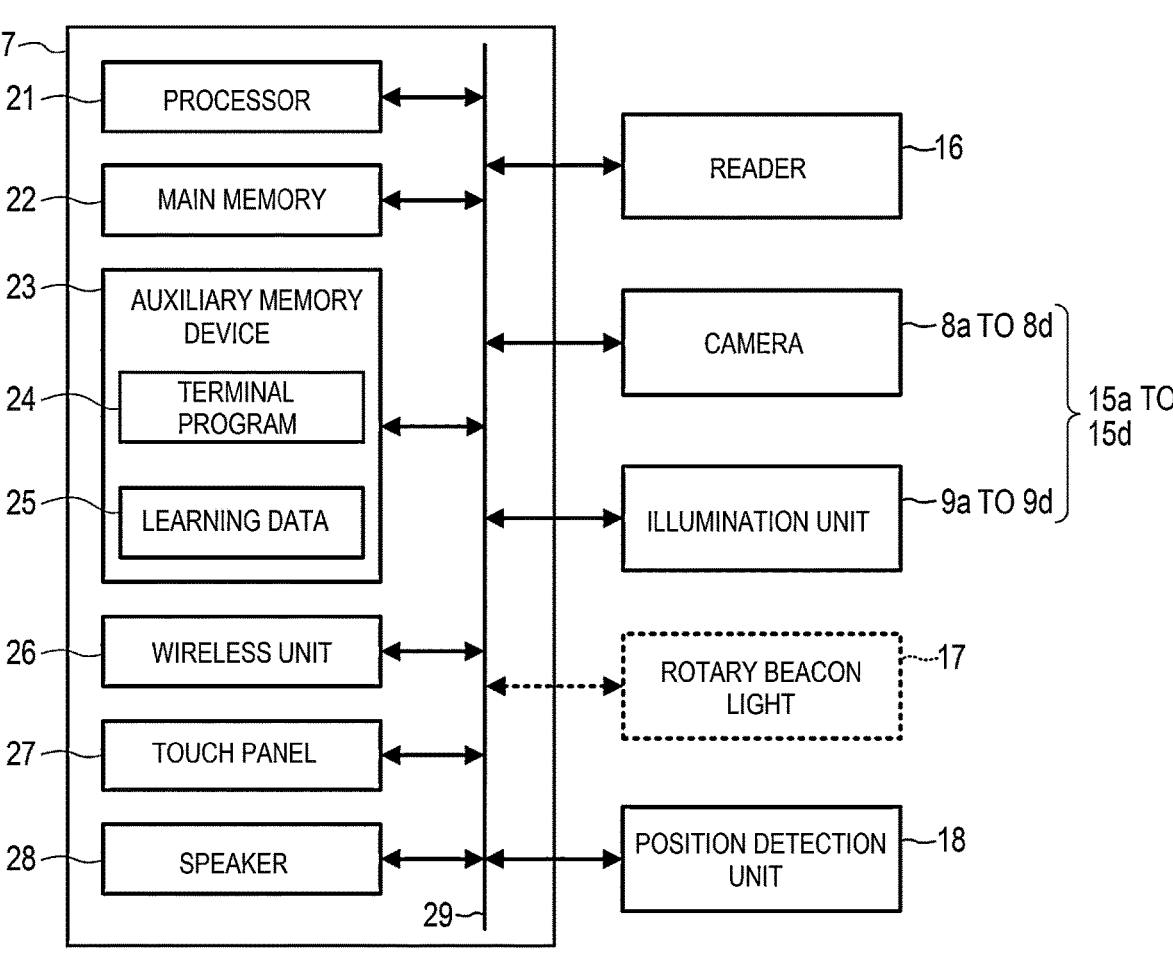
FIG. 3 is a block diagram showing an example of the circuit configuration of the information terminal.

FIG. 3 is a block diagram showing a main circuit configuration of the information terminal 7.

As shown in FIG. 3, the information terminal 7 has a processor 21, a main memory 22, the auxiliary memory device 23, a wireless unit 26, a touch panel 27, a speaker 28, and a system transmission path 29. The information terminal 7 may be a dedicated device or a general-purpose device such as a tablet computer. The system transmission path 29 includes an address bus, a data bus, a control signal line, a drive power supply line or the like.

In the information terminal 7, the processor 21, the main memory 22, the auxiliary memory device 23, the wireless unit 26, the touch panel 27, and the speaker 28 are coupled to the system transmission path 29. The information terminal 7 is also coupled to a reader 16, the cameras 8a to 8d, the illumination units 9a to 9d, a rotary beacon light 17, and a position detection unit 18 by the system transmission path 29 via an interface, not illustrated.

In the information terminal 7, the processor 21, the main memory 22, the auxiliary memory device 23, and the system transmission path 29 coupling these components, together form a computer.

The processor 21 is equivalent to a central unit of the computer. The processor 21 controls each part in order to implement various processing including registration processing, cancellation processing, package recognition processing, and identification code recognition processing of a merchandise item as the information terminal 7 according to an operating system or an application program. The processor 21 controls the image capture timing (timing of exposure) of the camera, using a trigger signal, which is a drive start pulse signal set in any manner.

The processor 21 switches the image capture mode of the cameras 8a to 8d from a consecutive image mode, described later, for the recognition of the package, to an identification code close-up mode, described later, for the recognition of the identification code. Conversely, if a switching is performed to return the application program from the identification code recognition processing to the package recognition processing, the processor 21 switches the image capture mode of the cameras 8a to 8d back to the consecutive image mode from the identification code close-up mode.

As an image capture mode in the embodiment, the consecutive image mode for the recognition of the package is an image capture mode in which one still image or one frame of still image is consecutively captured (video mode). The identification code close-up mode for the recognition of the identification code is an image capture mode in which an image is captured, using a shorter exposure time and a shorter focal length (equivalent to a shorter depth of field (DOF) in a barcode reader) than in the foregoing consecutive image mode.

The processor 21 uses, for example, a CPU (central processing unit) as a device but is not limited to this. The processor 21 may also be a multicore or multithreading-type and can execute a plurality of processes in parallel. The processor 21 can also include an AI chip specialized in AI. The processor 21 may also be implemented in various other forms including an integrated circuit such as a GPU (graphics processing unit), an ASIC (application specific integrated circuit), an FPGA (field-programmable gate array), or a DSP (digital signal processor).

The main memory 22 is equivalent to a main memory unit of the computer. The main memory 22 includes a non-volatile memory area and a volatile memory area. The main memory 22 stores at least an operating system or an application program in the non-volatile memory area. In some cases, the main memory 22 may store necessary data for the processor 21 to execute processing to control each part, in the non-volatile or volatile memory area. In the main memory 22, the volatile memory area is used as a work area where the processor 21 rewrites data according to need. The non-volatile memory area is, for example, a ROM (read only memory). The volatile memory area is, for example, a RAM (random access memory).

The auxiliary memory device 23 is equivalent to an auxiliary memory unit of the computer. For example, an EEPROM (trademark registered) (electrically erasable programmable read-only memory), an HDD (hard disc drive), or an SSD (solid state drive) or the like can be the auxiliary memory device 23. The auxiliary memory device 23 saves data used by the processor 21 to perform various processing or data generated as a result of processing by the processor 21, or the like.

In some cases, the auxiliary memory device 23 may store the application program to execute the foregoing functions and processing. In this embodiment, a terminal program 24 to cause the information terminal 7, the cameras 8a to 8d, and the illumination units 9a to 9d to execute functions as the article registration device according to the embodiment (registration and functions, cancellation a package recognition function, and an identification code recognition function for a merchandise item) is saved as the application program. The terminal program 24 may be stored in the main memory 22.

The auxiliary memory device 23 also stores learning data 25 learned for AI-based merchandise recognition with respect to each merchandise item put on sale at the store that is stored in the merchandise database 11 of the store server 2. The learning data 25 may be a copy of the learning data 13 included in the merchandise database 11 of the store server 2. The timing of copying the learning data 13 as the learning data 25 may be a specific timing such as each time the information terminal 7 is started up or may be any timing such that a copy of the learning data 13 is distributed from the store server 2 to each information terminal 7 when the learning data 25 is updated.

The wireless unit 26 wirelessly communicates data to and from the access point 4 in conformity with a wireless communication protocol.

Figure 4:
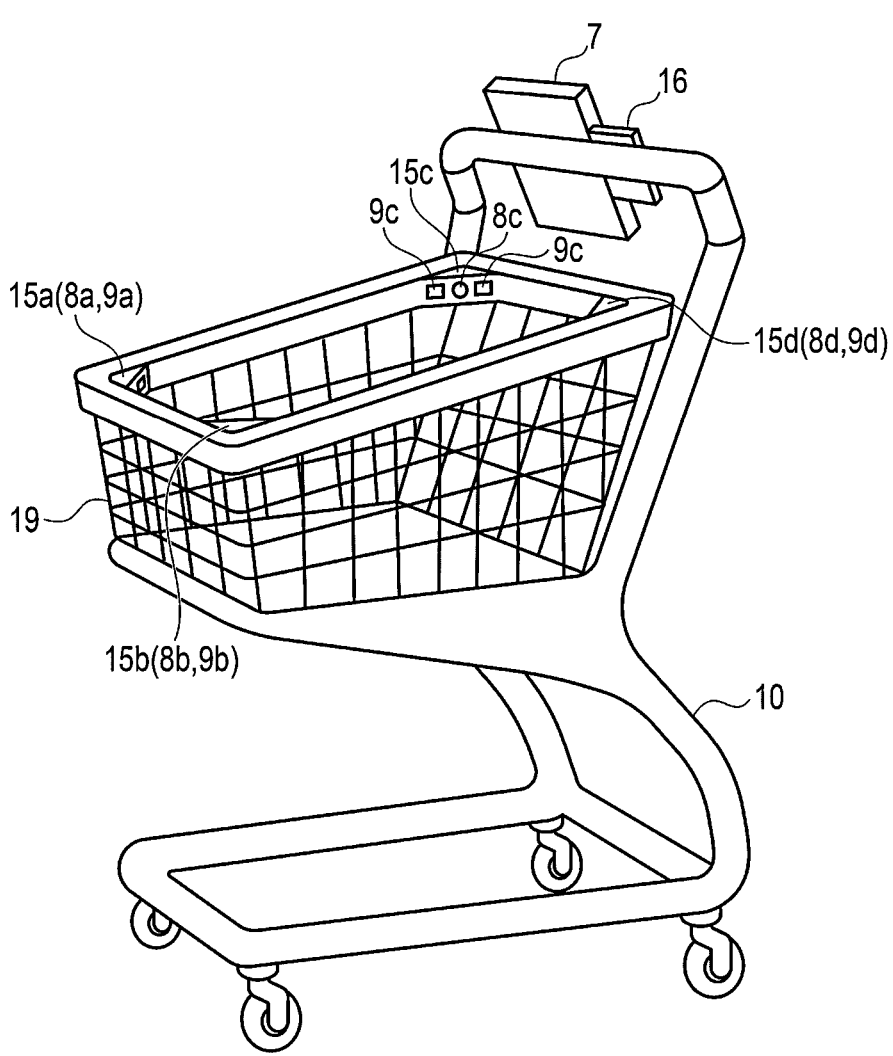
FIG. 4 shows an overall configuration of a shopping cart with a camera and an illumination unit arranged in each of the four corners of a basket.

The touch panel 27 is a device that serves as both an input device and a display device of the information terminal 7. The touch panel 27 displays an image based on image data outputted from the processor 21 and also detects a touch position on the displayed image and outputs touch position information thereof to the processor 21. As shown in FIG. 4, the information terminal 7 is installed on the cart 10 in such a direction and position that the customer can view a display on the touch panel 27 and can easily perform a touch operation.

The speaker 28 is contained in the casing of the information terminal 7 and plays back a sound based on sound data outputted from the processor 21. The sound that is played back includes an audio guide, a confirmation sound, an alert warning sound or the like. The audio guide is, for example, a voice that gives an instruction to read the identification code of a merchandise item and recognize the identification code, if the recognition of the package of the merchandise item has failed. Also, information about calling a store clerk (an announcement to call a store clerk, a voice of a store clerk who is responding, and the like) may be outputted by voice.

The reader 16 reads data recorded in a recording medium and outputs the read data to the processor 21. If the recording medium is a magnetic card, the reader 16 is a magnetic card reader. If the recording medium is a contact IC card, the reader 16 is an IC card reader. If the recording medium is a recording medium using RFID (radio frequency identification) such as a contactless IC card or a smartphone, an RFID reader is used as the reader 16. The position of installation of the reader 16 on the cart 10 is not particularly prescribed. For example, the reader 16 can be installed adjacently to the information terminal 7, as shown in FIG. 4.

The position detection unit 18 detects the position where a merchandise item is put (from among at least 20 areas A to T shown in FIGS. 5A to 5D and FIGS. 8A to 8D). The position detection unit 18 may be formed of a sensor element such as a distance sensor or may calculate the position of the merchandise item, based on image data, for example, by computational processing (triangulation or the like) using a parallax between images of the same merchandise item captured by different cameras 8 located at positions that do not face each other. If the position of the merchandise item is calculated by computational processing, the processor 21 may perform the processing. In this case, the position detection unit 18 is provided in the processor 21.

As shown in FIG. 4, as the cameras 8a to 8d, which are image pickup devices, four cameras 8a to 8d are provided on the cart 10 in such a way as to be able to capture an image of the inside of a basket 19 of the cart 10 from the four upper corners. In this example, one camera 8 (8a to 8d) and two illumination units 9 (9a to 9d) form one image pick unit 15 (15a to 15d), and one image pickup unit is arranged in each corner in such a way as to surround the edges of the four upper corners of the basket 19. The processor 21 controls the operations of the cameras 8a to 8d and the illumination units 9a to 9d.

In this arrangement example, an LED (light emitting diode) lamp that serves as a light-emitting source of the illumination units 9a to 9d is provided on both sides of the cameras 8a to 8d. The illumination units 9a to 9d are not constantly on but turn on when the package recognition and the identification code recognition are carried out using the cameras 8a to 8d. While an example where two illumination units 9a to 9d are arranged on both sides of the cameras 8a to 8d is described here, a configuration where one illumination unit 9a to 9d is provided on one side of the cameras 8a to 8d may be employed.

In this embodiment, an example where the illumination units 9a to 9d are arranged laterally adjacently to the cameras 8a to 8d is described. However, the position where the illumination units 9a to 9d are arranged is not limited, provided that the illumination units 9a to 9d can illuminate the image capture area (the areas A to T shown in FIG. 5A and the like) from the side of the cameras 8a to 8d. For example, the illumination units 9a to 9d may be arranged above or below the cameras 8a to 8d in the opening of the basket 19. In the example shown in FIG. 4, the upper edge of the basket 19 is increased in thickness and thus configured to contain the cameras 8a to 8d and the illumination units 9a to 9d inside and eliminate any protruding part, so that the merchandise item can be prevented from colliding with the cameras 8a to 8d and the illumination units 9a to 9d when the merchandise item is put in or taken out of the basket 19. In this embodiment, a configuration example where four cameras are arranged in the corners is described as an example. However, as a matter of course, the number of cameras is not limited to four and this embodiment can be implemented using one or more cameras.

In this embodiment, to capture an image used for the identification code recognition, the exposure time needs to be as short as possible in order to prevent the occurrence of a blur in the captured image of bars. However, to capture a bright image, an illumination to increase the amount of exposure of the subject by the amount of shortening of the exposure time is needed.

For the illumination light of the illumination units 9a to 9d in this embodiment, for example, an LED lamp is used and set to be on for an exposure time based on a predetermined amount of exposure, when a merchandise item is put into one area in the basket 19. The amount of exposure is such that the package recognition processing and the identification code recognition processing can be executed appropriately and blown-out highlights are not generated. In connection with the amount of exposure, an exposure time is set, based on the brightness of an area with the lowest luminance value, described later, as a reference value. Under this lighting, the cameras 8a to 8d capture an image for an exposure time during which an amount of exposure 31a to 31d or the like, described later, is acquired. As the processor 21 controls the light emission of the illumination units 9a to 9d, the power consumption of the battery installed in the cart 10 can be restrained.

The information terminal 7 may also have the rotary beacon light 17, as indicated by a dashed line in FIG. 3. The rotary beacon light 17 is coupled to the processor 21 by the system transmission path 29 via an interface, not illustrated. The rotary beacon light 17 is a lamp whose operation is controlled by the processor 21 and is configured to transmit the location of the customer to be served and report a warning to the customer using the cart 10 and a store clerk.

Whether the customer has put a merchandise item into the basket 19 or has taken a merchandise item out of the basket 19 is determined in the following way. The cameras 8a to 8d capture consecutive images or take consecutive shots of the merchandise item put into or taken out of the basket 19 of the cart 10. Based on the captured consecutive images, the latest image data and previous image data stored immediately before are successively compared and any change in the image (composition) of the merchandise item is thus detected.

If there is a change in the captured images, it is necessary to determine whether the merchandise item is put into or taken out of the basket 19, based on the direction in which the merchandise item moves in the image capture area of the camera 8. For example, if it is determined that the merchandise item has crossed the image capture area in a downward direction toward the bottom side of the basket 19, along an up-down direction intersecting the bottom side of the basket 19, it is then determined that the merchandise item is "put in". Meanwhile, if it is determined that merchandise item has crossed the image capture area in an upward direction away from the bottom side, it is then determined that the merchandise item is "taken out". If the merchandise item has not crossed the image capture area along the up-down direction but has moved a short distance in an obliquely downward direction or in a lateral direction, it is regarded that the merchandise item in the basket 19 has simply shifted in position and that there is no change in the detected image. Also, other than the determination based on the direction of movement of the merchandise item, a weight scale, not illustrated, may be arranged at the bottom side of the basket 19 and whether the merchandise item is put in or taken out may be detected based on a change, that is, an increase or decrease in the weight.

If the merchandise item is put into the basket 19 or taken out of the basket 19, the processor 21 recognizes the package of the merchandise item that is put in or taken out, using AI-based package recognition processing. Specifically, the processor 21 sets a rectangular area called a bounding box for the merchandise item in the latest image that has moved in the images, then performs image recognition of the merchandise image in the bounding box, based on the learning data 25 stored in the auxiliary memory device 23, and recognizes which merchandise item this merchandise item is.

Then, if the merchandise item is recognized by the package recognition processing, the processor 21 registers the recognized merchandise item in the foregoing merchandise-to-be-purchased list in the information terminal table 14 or cancels the registration thereof, and thus updates the merchandise-to-be-purchased list. Specifically, a merchandise registration notification is transmitted from the information terminal 7 to the cart controller 3. The cart controller 3 having received the merchandise registration notification stores the merchandise-to-be-purchased data about the recognized merchandise item in such a way as to add this merchandise-to-be-purchased data to the merchandise-to-be-purchased list in the merchandise-to-be-purchased data area 14c of the information terminal table 14 correlated with the member ID of the information terminal 7, or deletes the merchandise-to-be-purchased data, and thus updates the merchandise-to-be-purchased list. The update of the merchandise-to-be-purchased list is performed every time the customer registers or cancels a merchandise item to be purchased with the information terminal 7.

Meanwhile, if the package of the merchandise item that is put in or taken out cannot be recognized, the processor 21 switches to the identification code recognition processing and captures an image of the identification code of the merchandise item. The processor the 21 analyzes identification code included in the captured image and thus recognizes the merchandise item. If the merchandise item is recognized by such identification code recognition processing, the processor 21 updates the merchandise-to-be-purchased list in the information terminal table 14 similarly to the above.

Next, if the customer touches a payment button in the merchandise registration screen on the information terminal 7, the payment machine performs settlement processing.

In the payment processing by the payment machine 5, for example, the processor 21 generates a barcode based on the terminal ID allocated to the information terminal 7 and displays the barcode on the touch panel 27. The payment machine 5 reads the barcode and transmits a transaction inquiry command including the terminal ID to the cart controller 3. The cart controller 3 generates settlement data based on the merchandise-to-be-purchased list registered in the merchandise-to-be-purchased data area 14c of the information terminal table 14 corresponding to the terminal ID included in the transaction inquiry command and sends back the settlement data to the payment machine 5 that is the transmitter of the transaction inquiry command. The payment machine 5 prompts the customer to make settlement, based on the received settlement data, and performs the settlement for the merchandise item to be purchased.

The brightness of an area where a merchandise item is put with respect to each camera in an example where the camera and the illumination unit are arranged in the four corners of the basket 19 will now be described with reference to FIGS. 5A to 5D.

Figure 5A:
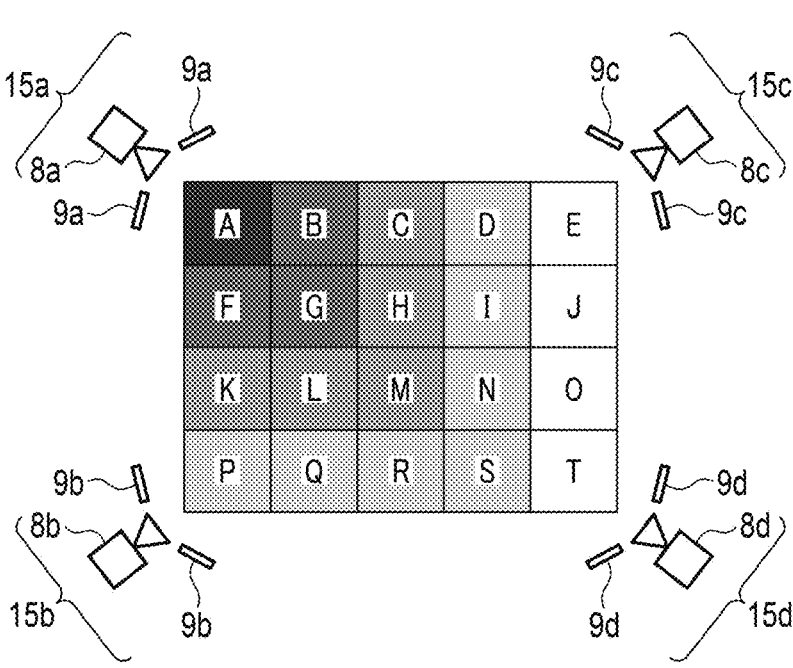
FIG. 5A shows the brightness of an area of a first camera in the example where a camera and an illumination unit are arranged in each of the four corners of the basket.

First, FIG. 5A shows the brightness (luminance value) of the area as viewed from the camera 8a under the illumination light cast when all the illumination units 9a to 9d are on in the example where the cameras 8a to 8d and the illumination units 9a to 9d are arranged in the four corners of the basket 19. The brightness of the area also refers to the magnitude of the amount of exposure of light incident on the camera per unit time when the camera 8a captures an image. As illustrated, the bottom side of the basket 19 where a merchandise item is put is divided into, for example, 20 areas A to T. The number of divided areas may be any number and may be suitably set according to the size of the bottom side, or the like.

If the brightness of the illumination light in each area as viewed from the camera 8a is divided into five levels of "1" (dark) to "5" (bright), the areas A to T show a luminance distribution (brightness per unit area as viewed from above) or a light amount distribution (magnitude of the amount of light per unit area) as shown in FIG. 5A. The brightness is "0" when all the illumination units 9a to 9d are off.

The brightness of the areas A to T becomes lower as the distance from the camera 8a becomes longer, in proportion to the distance from the camera 8a. That is, in relation to the camera 8a, the area A is at the level "5". The areas B, F, G are at the level "4". The areas C, H, K, L, M are at the level "3". The areas D, I, N, P, Q, R, S are at the level "2". The areas E, J, O, T are at the level "1".

Figure 5B:
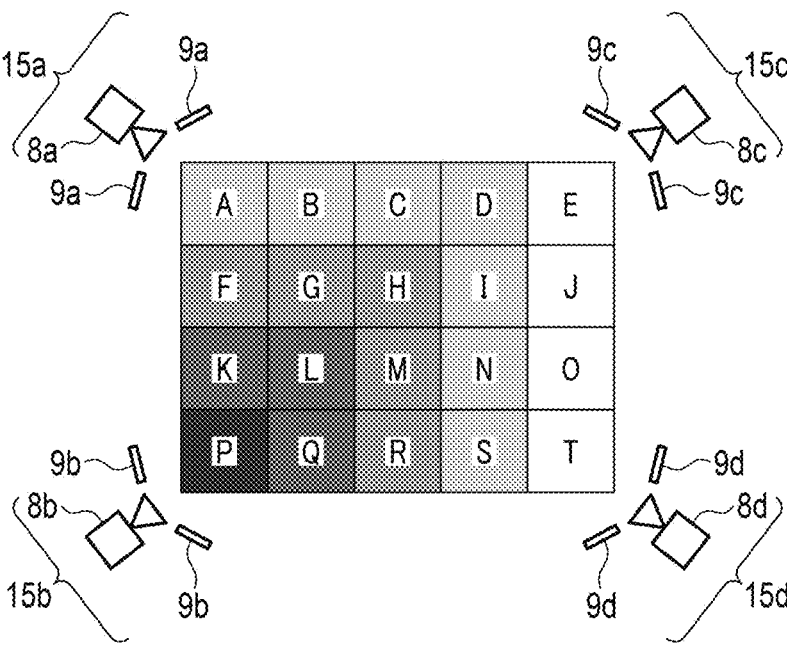
FIG. 5B shows the brightness of an area of a second camera in the example.
Figure 5C:
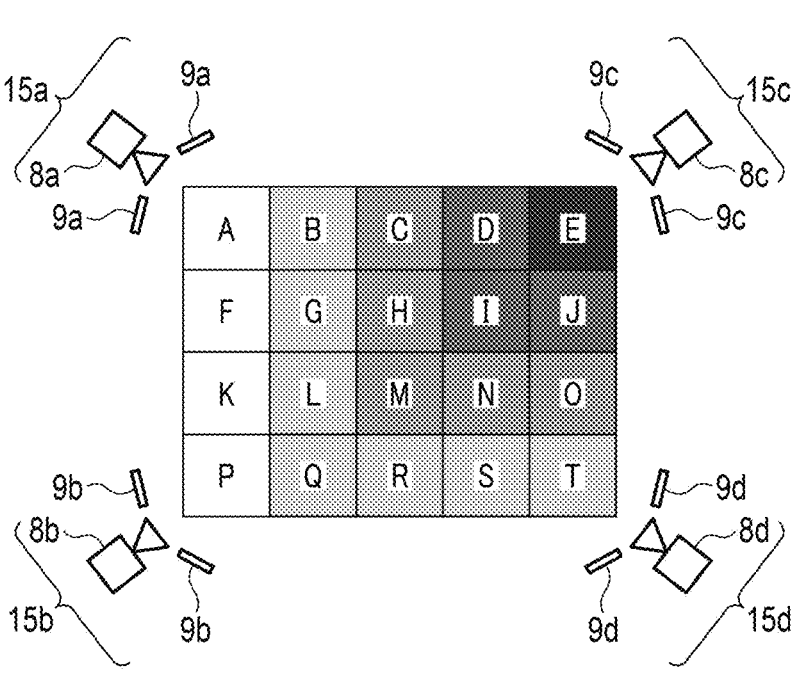
FIG. 5C shows the brightness of an area of a third camera in the example.
Figure 5D:
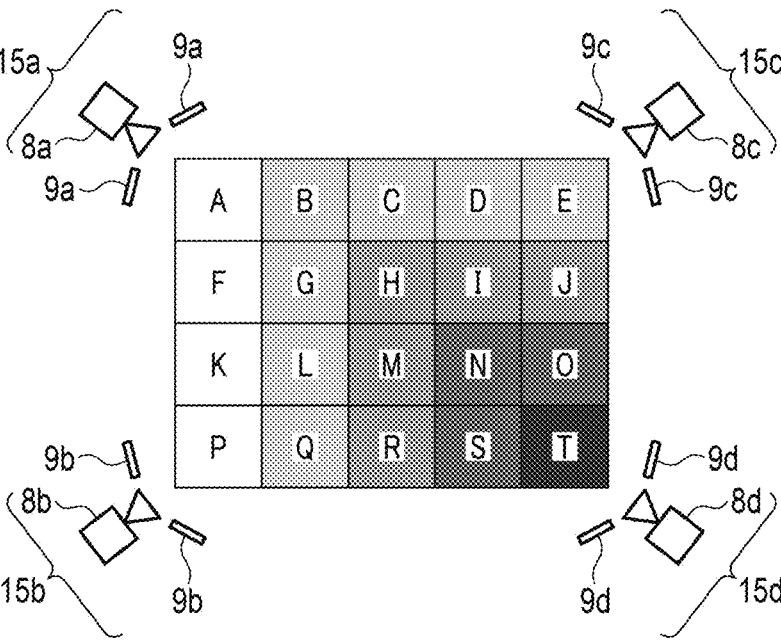
FIG. 5D shows the brightness of an area of a fourth camera in the example.

Similarly, FIG. 5B shows the brightness of each of the areas A to T as viewed from the camera 8b, FIG. 5C shows the brightness of each of the areas A to T as viewed from the camera 8c, and FIG. 5D shows the brightness of each of the areas A to T as viewed from the camera 8d, under the illumination light cast when all the illumination units 9a to 9d are on.

The amount of exposure of light incident on the cameras 8a to 8d from the area A when the cameras 8 have the same exposure time in the image capture will now be described. The amount of exposure of light incident on each of the cameras 8a to 8d is proportional to the luminance value, which is the brightness of the area. Therefore, in FIGS. 5A to 5D, the level of the area A is the level "5" for the camera 8a, the level "2" for the camera 8b, and the level "1" for the cameras 8c, 8d. In order to achieve the same brightness in the images captured by the cameras 8a to 8d, the cameras 8a to 8d need to have the same amount of exposure. Since the amount of illumination light cast by all the illumination units 9a to 9d cannot be linearly increased or decreased, the amount of exposure is adjusted by the exposure time of the cameras. That is, under the illumination cast when all the illumination units 9a to 9d are on, a reference exposure time is set in such a way that the amount of exposure of the cameras 8c, 8d corresponding to the lowest level "1" becomes appropriate, and the exposure time of the cameras 8a, 8b corresponding to the other levels is adjusted accordingly. Thus, the camera 8a needs to execute exposure control to reduce the exposure time in such a way as to reduce the amount of incident light by four levels. Similarly, the camera 8b needs to execute exposure control to reduce the exposure time in such a way as to reduce the amount of light by three levels.

Figure 6:
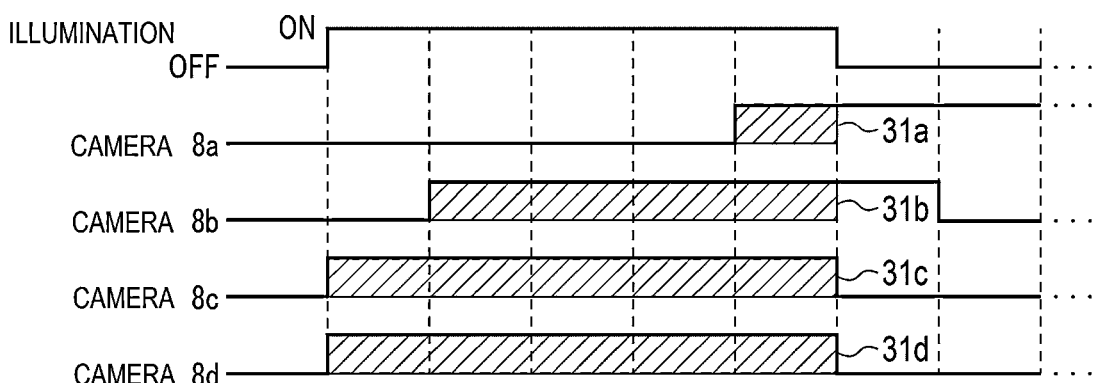
FIG. 6 shows the exposure timing of each camera in the case where a merchandise item is put in an area A in the example.

The exposure control in the cameras 8a to 8d in the case where a merchandise item to be purchased is put in the area A will now be described with reference to FIGS. 5A to 5D and FIG. 6. FIG. 6 shows the exposure timing and the amount of exposure of each of the cameras 8a to 8d capturing an image of the area A under the illumination light cast when all the illumination units 9a to 9d are on. The amounts of exposure 31a to 31d shown in FIG. 6 have the same value, though the period of incidence differs because the amount of incident light per unit time differs between the cameras 8a to 8d.

In this embodiment, as the exposure timing (the time when the shutter starts to open or the time when light starts to become incident on the image pickup element) of the cameras 8a to 8d, the exposure is started in response to the input of a trigger signal outputted from the processor 21. The exposure time (the shutter opening period or the light receiving period of the image pickup element) of the cameras 8a to 8d is set in advance to be a predetermined time period that is common to all the cameras at the time of manufacturing or shipment. Of course, the exposure time can be changed by changing the setting of the application program in the processor 21.

All the illumination units 9a to 9d simultaneously turn on or off the illumination under the control of the processor 21. Of course, the processor 21 can cause the illumination units 9a to 9d to turn on and off individually. The lighting time (lighting period) under the control of the processor 21 is set in such a way that the amounts of exposure of the cameras 8c, 8d corresponding to the level "1" become the amounts of exposure 31c, 31d, which enable the package recognition and the identification code recognition to be executed appropriately in the state where all the illumination units 9a to 9d are on, as described above.

Therefore, the exposure time of the cameras 8c, 8d and the lighting period of all the illumination units 9a to 9d are the same period. In the camera 8a, the exposure time (exposure period) is reduced to ⅕ in order to reduce the amount of exposure 31a of incident light so that the brightness of the image drops by four levels in relation to the amounts of exposure 31c, 31d of the cameras 8c, 8d, as described above. This ⅕ time is a time reduction to lower the brightness by four levels. If the exposure time and the attenuation of the brightness are not linearly proportional, the exposure time is not necessarily be ⅕ when the brightness is lowered by four levels. Thus, the processor 21 delays the trigger signal to start the exposure of the camera 8a by ⅘ time from the exposure start timing of the cameras 8c, 8d, which is the lighting start time of the illumination units 9, and inputs this delayed trigger signal to the camera 8a. That is, the exposure start time is delayed by ⅘ time from the lighting start time of the illumination units 9. Similarly, for the camera 8b, in order to lower the brightness by one level, the processor 21 delays the trigger signal by ⅕ time from the exposure start timing of the cameras 8c, 8d and inputs this delayed trigger signal to the camera 8b.

The exposure control in the cameras 8a to 8d in the case where a merchandise item put in the basket 19 is laid over a plurality of areas will now be described. In this case, for example, the center of all the areas A to T is defined as a determination reference point. In FIG. 5A, the center of the sides in contact with each other of the area H and the area M is defined as a determination reference point. A diagonal line in a direction of crossing the front of the camera may be defined as a determination reference line. The positions of the determination reference point and the determination reference line may be set to be any positions.

If the position of the merchandise item put in the basket 19 is in an area farther than the determination reference point as viewed from the cameras 8a to 8d, an area on the brighter side is selected. If the position of the merchandise item is in an area closer than the determination reference point, an area on the darker side is selected. For example, if the merchandise item is put at a position over the areas A and B, for the camera 8a, this position is closer than the determination reference point and therefore the area B on the darker side is selected. For the camera 8b, the areas A and B have the same brightness and therefore either the area A or the area B is selected. For the camera 8c, this position is farther than the determination reference point and therefore the area B on the brighter side is selected. Similarly, for the camera 8d, the area B is selected. Of course, this setting method is an example and other setting methods may be used. For example, the proportion at which the merchandise item is laid in each of a plurality of areas can be used as a determination reference and the brightness of the area where half or more of the merchandise item is laid can be selected.

In this way, the timing of starting the exposure of the camera is delayed in response to the difference in the brightness (luminance) of the illumination light varying on a per area basis in the basket 19. Thus, the cameras 8a to 8d can receive the same amount of exposure of light through the exposure and the brightness of the captured images can be made uniform to a level that enables image recognition. Thus, blown-out highlights due to overexposure can be prevented. Also, the exposure time can be adjusted by the time reduction based on the delayed input of the trigger signal and high-speed registration processing of a merchandise item to be purchased can be achieved, compared with the automatic adjustment of the exposure time that has been employed up to now.

Second Embodiment

A second embodiment will now be described with reference to FIG. 7 and FIGS. 8A to 8D.

The cart POS system 1 according to this embodiment differs from the foregoing first embodiment in the arrangement of the cameras 8a to 8d and the illumination units 9a to 9d installed in the basket 19 of the cart 10. The other parts of the cart POS system 1 are configured similarly to those in the first embodiment. In the description below, this embodiment is described by simplifying the detailed description using the foregoing components and reference signs in the first embodiment.

Figure 7:
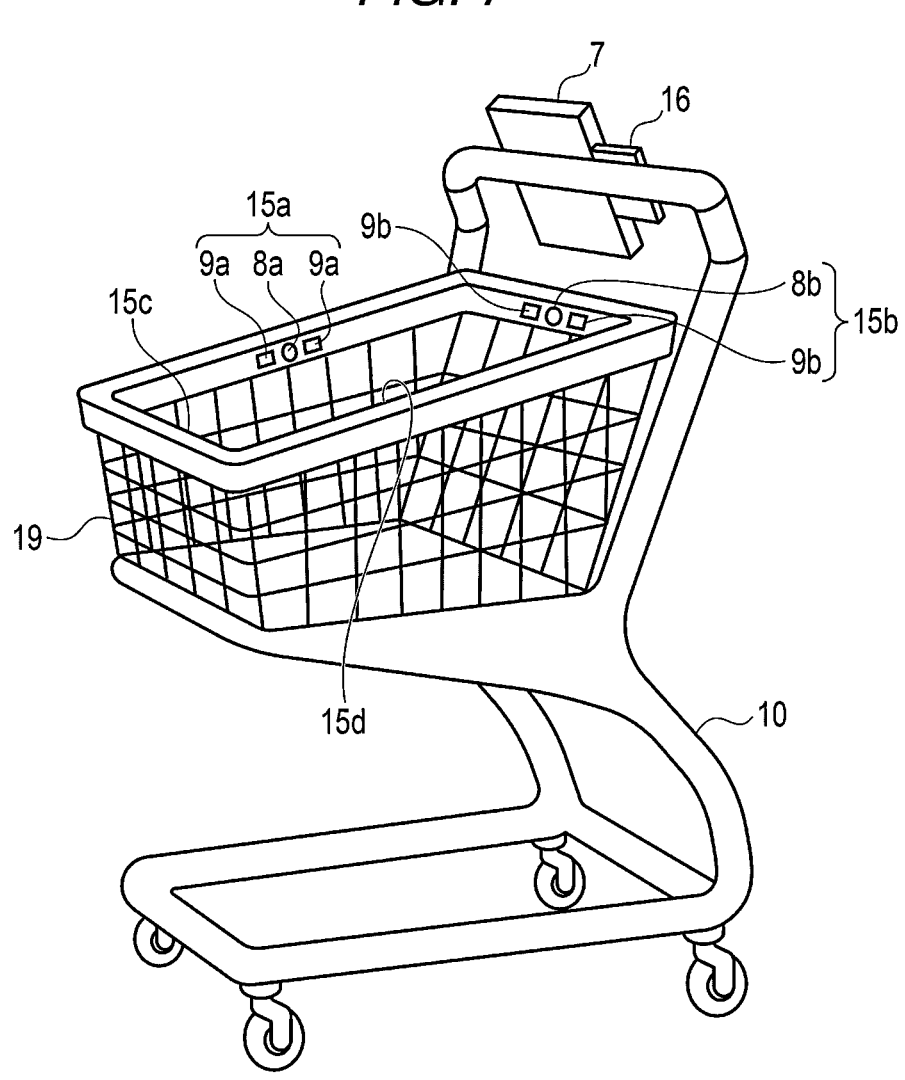
FIG. 7 shows an overall configuration of a shopping cart with a camera and an illumination unit arranged at the center of each of the four sides of the opening of a basket according to a second embodiment.

As shown in FIG. 7, in this embodiment, as the cameras 8a to 8d, which are image pickup devices, four cameras 8a to 8d are provided on the cart 10 in such a way as to be able to capture an image of the inside of the basket 19 of the cart 10 from four directions above. In this example, one camera 8 (8a to 8d) and two illumination units 9 (9a to 9d) form one image pick unit 15 (15a to 15d), and one image pickup unit is arranged at the center of each of the four sides of the upper part of the basket 19. The processor 21 controls the operations of the cameras 8a to 8d and the illumination units 9a to 9d.

The brightness of an area where a merchandise item is put with respect to the cameras 8a to 8d in an example where the cameras 8a to 8d and the illumination units 9a to 9d are arranged at the centers of the four sides of the basket 19 will now be described with reference to FIGS. 8A to 8D. As illustrated, the bottom side of the basket 19 where a merchandise item is put is divided into, for example, 20 areas A to T. The number of divided areas may be any number and may be suitably set according to the size of the bottom side, or the like.

Figure 8A:
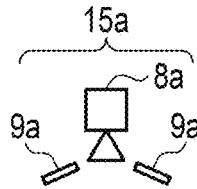
FIG. 8A shows the brightness of an area of a first camera in the example where a camera and an illumination unit are arranged at the center of each of the sides of the basket.
Figure 8A:
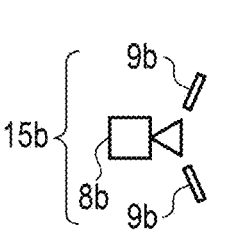
Figure 8A:
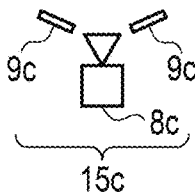
Figure 8A:
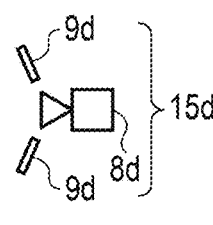
Figure 8A:
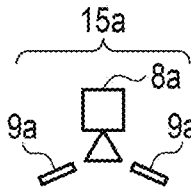

First, FIG. 8A shows the brightness (luminance value) of the area as viewed from the camera 8a arranged at the center of a long side under the illumination light cast when all the illumination units 9a to 9d are on in the example where the cameras 8a to 8d and the illumination units 9a to 9d are arranged at the centers of the sides of the basket 19. The brightness of the area also refers to the magnitude of the amount of exposure of light incident on the camera per unit time when the camera 8a captures an image. If the brightness of the illumination light as viewed from the camera 8a is divided into five levels of "1" (dark) to "5" (bright), the areas A to T show a luminance distribution (brightness per unit area as viewed from above) or a light amount distribution (magnitude of the amount of light per unit area) as shown in FIG. 8A. The brightness is "0" when all the illumination units 9a to 9d are off.

The brightness of the areas A to T becomes lower as the distance from the camera 8a becomes longer, in proportion to the distance from the camera 8a. That is, in relation to the camera 8a, the area C is at the level "5". The areas B, D, G, H, I are at the level "4". The areas A, E, F, J, K, L, M, N, O are at the level "3". The areas P, Q, R, S, T are at the level "2".

Figure 8B:
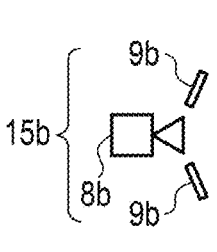
FIG. 8B shows the brightness of an area of a second camera in the example.
Figure 8B:
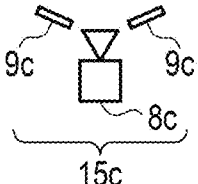
Figure 8B:
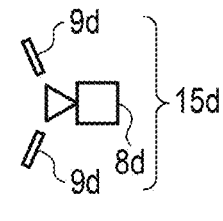

FIG. 8B shows the brightness (luminance value) of the area as viewed from the camera 8b arranged at the center of a short side under the illumination light cast when all the illumination units 9a to 9d are on in the example where the cameras 8a to 8d and the illumination units 9a to 9d are arranged at the centers of the sides of the basket 19. That is, in relation to the camera 8b, the areas F, K are at the level "5". The areas A, G, L, P are at the level "4". The areas B, H, M, Q are at the level "3". The areas C, I, N, R are at the level "2". The areas D, E, J, O, S, T are at the level "1".

Figure 8C:
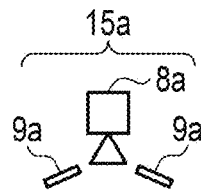
FIG. 8C shows the brightness of an area of a third camera in the example.
Figure 8C:
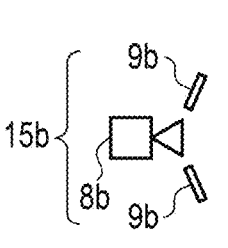
Figure 8C:
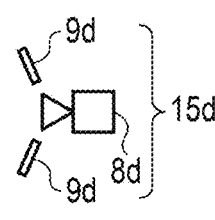
Figure 8C:
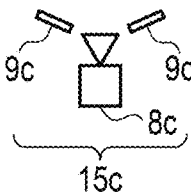
Figure 8D:
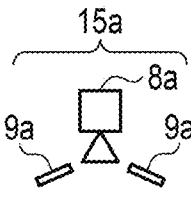
FIG. 8D shows the brightness of an area of a fourth camera in the example.
Figure 8D:
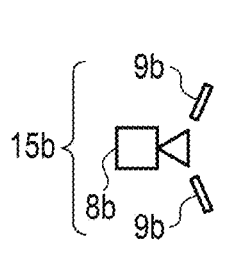
Figure 8D:
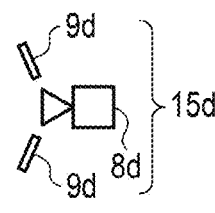
Figure 8D:
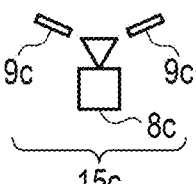

Similarly, FIG. 8C shows the brightness of each of the areas A to T as viewed from the camera 8c and FIG. 8D shows the brightness of each of the areas A to T as viewed from the camera 8d, under the illumination light cast when all the illumination units 9a to 9d are on.

The amount of exposure of light incident on the cameras 8a to 8d from the area A when the cameras 8a to 8d have the same exposure time will now be described.

In FIGS. 8A to 8D, the area A is at the level "3" for the camera 8a, the level "4" for the camera 8b, the level "2" for the camera 8c, and the level "1" for the cameras 8d. In order to achieve the same brightness (amount of exposure) in the cameras 8a to 8d, the brightness is adjusted based on the exposure time, as described above. That is, under the illumination cast when all the illumination units 9a to 9d are on, a reference exposure time is set in such a way that the amount of exposure of the camera 8d corresponding to the lowest level "1" becomes appropriate, and the exposure time of the cameras 8a, 8b, 8c corresponding to the other levels is adjusted accordingly. Thus, the camera 8a needs to execute exposure control to reduce the exposure time in such a way as to reduce the amount of incident light by three levels. Similarly, the camera 8b and the camera 8c need to execute exposure control to reduce the exposure time in such a way as to reduce the amount of light by two levels and by one level, respectively.

Figure 9:
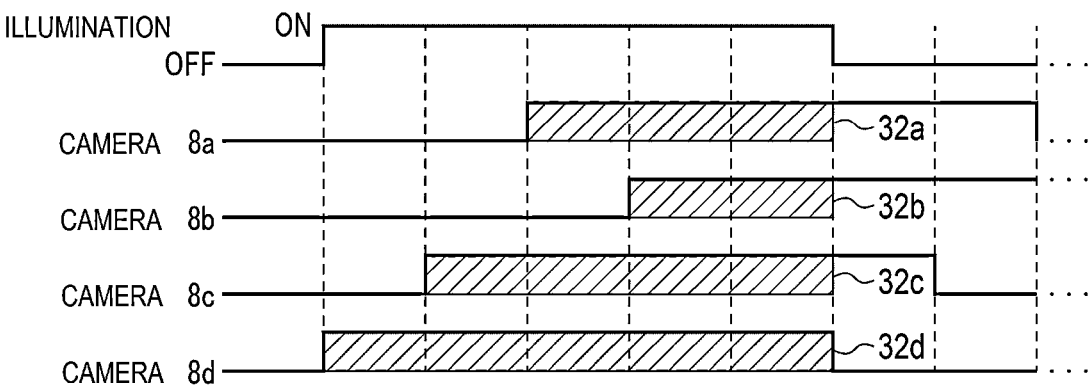
FIG. 9 shows the exposure timing of each camera in the case where a merchandise item is put in an area A in the example.

The exposure control in the cameras 8a to 8d in the case where a merchandise item to be purchased is put in the area A will now be described with reference to FIG. 8A and FIG. 9. FIG. 9 shows the exposure timing and the amount of exposure of each of the cameras 8a to 8d capturing an image of the area A under the illumination light cast when all the illumination units 9a to 9d are on. The amounts of exposure 32a to 32d shown in FIG. 9 have the same value, though the period of incidence differs because the amount of incident light per unit time differs between the cameras 8a to 8d.

In this embodiment, as the exposure timing (the time when the shutter starts to open or the time when light starts to become incident on the image pickup element) of the cameras 8a to 8d, the exposure is started in response to the input of a trigger signal outputted from the processor 21. The exposure time (the shutter opening period or the light receiving period of the image pickup element) of the cameras 8a to 8d is set in advance to be a predetermined time period that is common to all the cameras at the time of manufacturing or shipment. Of course, the exposure time can be changed by changing the setting of the application program in the processor 21.

All the illumination units 9a to 9d simultaneously turn on or off the illumination under the control of the processor 21. The lighting time (lighting period) under the control of the processor 21 is set in such a way that the amount of exposure of the camera 8d corresponding to the level "1" becomes an amount of exposure that enables the package recognition and the identification code recognition to be executed appropriately in the state where all the illumination units 9a to 9d are on, as described above. Therefore, the exposure time of the camera 8d and the lighting period of all the illumination units 9a to 9d are the same period.

In the camera 8a, the exposure time needs to be reduced to ⅗ in order to reduce the amount of exposure 32a of incident light so that the brightness of the image drops by two levels in relation to the amount of exposure 32d of the camera 8d, as described above. Thus, the processor 21 delays the trigger signal to start the exposure of the camera 8a by ⅖ time in relation to the camera 8d and inputs this delayed trigger signal to the camera 8a. This ⅖ time is a time reduction to lower the brightness by three levels. If the exposure time and the attenuation of the brightness are not linearly proportional, the exposure time is not necessarily be ⅖ when the brightness is lowered by three levels.

For the camera 8b, in order to lower the brightness by three levels, the trigger signal is delayed by ⅗ time in relation to the camera 8d and then inputted to the camera 8b. For the camera 8c, in order to lower the brightness by one level, the trigger signal is delayed by ⅕ time in relation to the camera 8d and then inputted to the camera 8c.

In this way, the timing of starting the exposure of the camera is delayed in response to the difference in the brightness (luminance) of the illumination light varying on a per area basis in the basket 19. Thus, the cameras 8a to 8d can receive the same amount of exposure of light through the exposure and the brightness of the captured images can be made uniform to a level that enables image recognition. Thus, blown-out highlights due to overexposure can be prevented.

A modification example will now be described with reference to FIG. 10.

Figure 10:
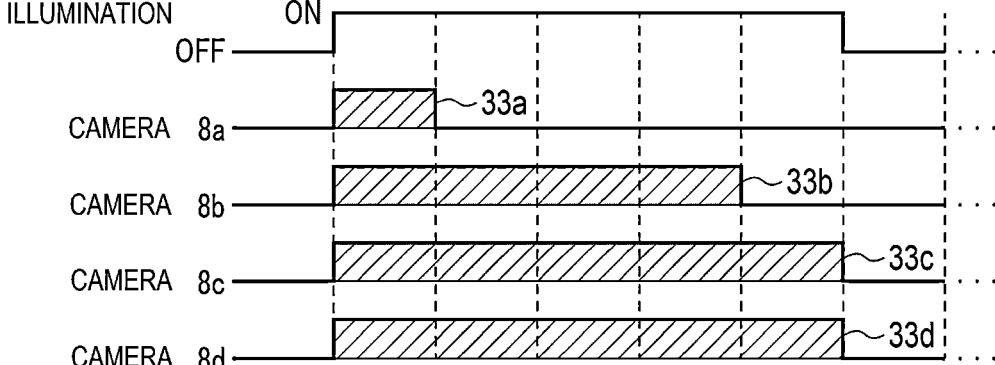
FIG. 10 shows the exposure timing of each camera in the case where a merchandise item is put in an area A in an example where a camera and an illumination unit are arranged in each of the four corners of a basket according to a modification example.

FIG. 10 shows the exposure timing of each camera in the case where a merchandise item is put in the area A in an example where the cameras 8a to 8d and the illumination units 9a to 9d are arranged in the four corners of the basket 19 according to the modification example. In the foregoing first and second embodiments, the exposure time of the camera is delayed in order to reduce the amount of exposure of incident light so that the brightness of the image drops in relation to the amount of exposure of the camera.

In the modification example, all the illumination units 9a to 9d are turned on. The image capture is started at the exposure timing when the cameras 8a to 8d simultaneously start the exposure. The exposure is ended after the lapse of the exposure time corresponding to the brightness of the area for each camera.

In this modification example, a change in the exposure time of the camera can be implemented by changing a register value that sets the exposure time of the image pickup element (image sensor). For example, as shown in the foregoing FIG. 5A, the exposure time corresponding to the brightness of each of the areas A to T for each camera under the illumination is calculated. An exposure time table that sets the register value equivalent to the exposure time on a per area basis for each camera is generated and stored in a rewritable manner in the auxiliary memory device 23 of the information terminal 7.

Based on the area where a merchandise item to be purchased is put, detected by the position detection unit 18, the processor 21 reads out the register value of the corresponding area from the exposure time table in the auxiliary memory device 23 and changes the register value of the image sensor. Subsequently, the processor 21 causes the cameras to capture an image of the merchandise item and thus acquires the image of the merchandise item.

In FIG. 10, as shown in the foregoing FIG. 5A, the cameras 8c, 8d have the brightness of level "1". To acquire the amounts of exposure 33c, 33d, the exposure time and the lighting time of all the illumination units 9a to 9d are the same period. For the camera 8a, the exposure time is reduced to ⅕ in order to reduce the amount of exposure 33a of incident light so that the brightness of the image drops by four levels in relation to the amounts of exposure 33c, 33d of the cameras 8c, 8d. Similarly, for the camera 8b, the exposure time is reduced to ⅘ in order to reduce the amount of exposure 33b of incident light so that the brightness drops by one level.

According to this modification example, the exposure of the cameras 8a to 8d end within the period when the illumination units 9a to 9d are on. Therefore, image capture can be executed at a higher speed than in the foregoing first and second embodiments.

One aspect of the present disclosure has been presented simply as an example and is not intended to limit the scope of the present disclosure. The one aspect can be implemented in various other forms and can include various omissions, replacements, and changes without departing from the spirit and scope of the present disclosure. The one aspect and modifications thereof are included in the spirit and scope of the present disclosure and also included in the scope of the claims and equivalents thereof.

What is claimed is:

1. An article registration device, comprising: at least one image pickup device configured to capture an image of an article in an image capture area;

at least one illumination component configured to illuminate the image capture area for a lighting period based on a set amount of exposure;

a position detection component configured to divide the image capture area into a plurality of areas and detect an area where the article is under the illumination of the illumination component; and an information terminal configured to cause the image pickup device to capture an image, by setting an amount of exposure time based on a brightness of illumination corresponding to a distance between the detected area and the image pickup device, recognize the article within the captured image, and register the article.

2. The article registration device according to claim 1, wherein the information terminal is further configured to: set the lighting period based on the set amount of exposure, using a darkest area of the detected areas as a reference, and delay an exposure start time of the image pickup device from a lighting start time of the illumination component in such a way as to achieve the exposure time on a per image pickup device basis, and cause the image pickup device to capture an image with the set amount of exposure.

3. The article registration device according to claim 1, wherein the article registration device is installed in a cart provided with a basket, the image pickup device captures an image over the image capture area including a bottom side of the basket where the article is, from an upper part of an opening of the basket, and the position detection component divides the bottom side of the basket into the plurality of areas and detects the area where the article is under the illumination of the illumination component.

4. The article registration device according to claim 1, wherein the information terminal recognizes the article by one of package recognition processing to recognize the article, based on a package of the article included in the captured image, and identification code recognition processing to analyze an identification code of the article included in the captured image and recognize the article.

5. The article registration device according to claim 1, wherein the article registration device is a self-service point of sale apparatus.

6. The article registration device according to claim 1, wherein the at least one image pickup device and the information terminal use a consecutive image mode for the recognition of the article.

7. The article registration device according to claim 1, wherein the at least one image pickup device and the information terminal use an identification code close-up mode for the recognition of the article.

8. The article registration device according to claim 1, wherein the at least one image pickup device comprises at least four image pickup devices.

9. A cart POS system, comprising:
a plurality of carts equipped with an article registration device and configured to function as a POS (point of sales) terminal, the article registration device, comprising:
at least one image pickup device configured to capture an image of an article in an image capture area;
at least one illumination component configured to illuminate the image capture area for a lighting period based on a set amount of exposure;
a position detection component configured to divide the image capture area into a plurality of areas and detect an area where the article is under the illumination of the illumination component; and
an information terminal configured to cause the image pickup device to capture an image, by setting an amount of exposure time based on a brightness of illumination corresponding to a distance between the detected area and the image pickup device, recognize the article within the captured image, and register the article; and
a payment machine configured to execute settlement processing for the registered article.

10. The cart POS system according to claim 9, wherein the information terminal is further configured to: set the lighting period based on the set amount of exposure, using a darkest area of the detected areas as a reference, and delay an exposure start time of the image pickup device from a lighting start time of the illumination component in such a way as to achieve the exposure time on a per image pickup device basis, and cause the image pickup device to capture an image with the set amount of exposure.

11. The cart POS system according to claim 9, wherein the article registration device is installed in a cart provided with a basket, the image pickup device captures an image over the image capture area including a bottom side of the basket where the article is, from an upper part of an opening of the basket, and the position detection component divides the bottom side of the basket into the plurality of areas and detects the area where the article is under the illumination of the illumination component.

12. The cart POS system according to claim 9, wherein the information terminal recognizes the article by one of package recognition processing to recognize the article, based on a package of the article included in the captured image, and identification code recognition processing to analyze an identification code of the article included in the captured image and recognize the article.

13. The cart POS system according to claim 9, wherein the article registration device is a self-service point of sale apparatus.

14. The cart POS system according to claim 9, wherein the at least one image pickup device and the information terminal use a consecutive image mode for the recognition of the article.

15. The cart POS system according to claim 9, wherein the at least one image pickup device and the information terminal use an identification code close-up mode for the recognition of the article.

16. The cart POS system according to claim 9, wherein the at least one image pickup device comprises at least four image pickup devices.

17. An article registration method, comprising:
capturing an image of an article in an image capture area, by at least one image pickup device;
illuminating the image capture area for a lighting period based on a set amount of exposure, by at least one illumination component;
dividing, by a position detection component the image capture area into a plurality of areas and detecting an area where the article is under the illumination of the illumination component; and
setting an amount of exposure time, based on a brightness of illumination corresponding to a distance between the detected area and the image pickup device, recognizing the article within the captured image; and registering the article.

18. The article registration method according to claim 17, further comprising: setting the lighting period based on the set amount of exposure, using a darkest area of the detected areas as a reference, and delaying an exposure start time of the image pickup device from a lighting start time of the illumination component in such a way as to achieve the exposure time on a per image pickup device basis, and causing the image pickup device to capture an image with the set amount of exposure.

19. The article registration method according to claim 17, wherein the article registration device is installed in a cart provided with a basket, further comprising: capturing an image over the image capture area including a bottom side of the basket where the article is, from an upper part of an opening of the basket, and dividing the bottom side of the basket into the plurality of areas and detects the area where the article is under the illumination of the illumination component.

20. The article registration method according to claim 17, further comprising: recognizing the article by one of package recognition processing to recognize the article, based on a package of the article included in the captured image, and identification code recognition processing to analyze an identification code of the article included in the captured image and recognize the article.

*    *    *    *    *